(12) United States Patent
Yamano

(10) Patent No.: US 8,254,035 B2
(45) Date of Patent: Aug. 28, 2012

(54) ZOOM LENS AND IMAGE-CAPTURE DEVICE

(75) Inventor: Hiroki Yamano, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/216,492

(22) Filed: Jul. 7, 2008

(65) Prior Publication Data

US 2009/0052052 A1 Feb. 26, 2009

(30) Foreign Application Priority Data

Aug. 22, 2007 (JP) .................................. 2007-215988

(51) Int. Cl.
*G02B 15/14* (2006.01)
*G02B 17/00* (2006.01)

(52) U.S. Cl. .......... 359/684; 359/683; 359/726; 359/733

(58) Field of Classification Search .................. None
See application file for complete search history.

(56) References Cited

U.S. PATENT DOCUMENTS

| | | | | |
|---|---|---|---|---|
| 7,154,680 | B2 * | 12/2006 | Satori et al. ................. | 359/687 |
| 7,505,212 | B2 * | 3/2009 | Omichi ........................ | 359/683 |
| 2005/0275735 | A1 * | 12/2005 | Nanjo ........................ | 348/240.3 |
| 2006/0017834 | A1 * | 1/2006 | Konno et al. ............... | 348/335 |
| 2007/0008418 | A1 * | 1/2007 | Kuroda et al. ............. | 348/240.3 |
| 2008/0137218 | A1 * | 6/2008 | Omichi ........................ | 359/764 |

FOREIGN PATENT DOCUMENTS

| | | |
|---|---|---|
| JP | 2005-181635 | 7/2005 |
| JP | 2005-215165 | 8/2005 |
| JP | 2006-154705 | 6/2006 |
| JP | 2006-251037 | 9/2006 |
| WO | WO 2005073774 A1 * | 8/2005 |

OTHER PUBLICATIONS

Geary, Joseph M. Introduction to Lens Design: with Practical ZEMAX Examples. Richmond, VA: Willmann-Bell, 2002. p. 23. Print.*

Japanese Office Action issued Mar. 19, 2009 for corresponding Japanese Application No. 2007-215988.

* cited by examiner

*Primary Examiner* — Ricky Mack
*Assistant Examiner* — Zachary Wilkes
(74) *Attorney, Agent, or Firm* — Rader, Fishman & Grauer PLLC

(57) ABSTRACT

A zoom lens includes a plurality of lens groups having at least first, second and third lens groups arranged in order from an object side. The first lens group has a positive refractive power which is firmly secured when the magnification is changed, the second lens group has a negative refractive power which is shifted to the image side when the magnification is changed from the wide angle end to the telescopic end, and the third lens group has a positive refractive power which is firmly secured when the magnification is changed. The first lens group is configured by arranging, in order from the object side, a single lens having a negative refractive power, a prism having a reflection surface to create a 90° bend in a light path, and at least one single lens having a positive refractive power.

8 Claims, 15 Drawing Sheets

TRANSVERSE
ABERRATION

TRANSVERSE ABERRATION

FIG.7
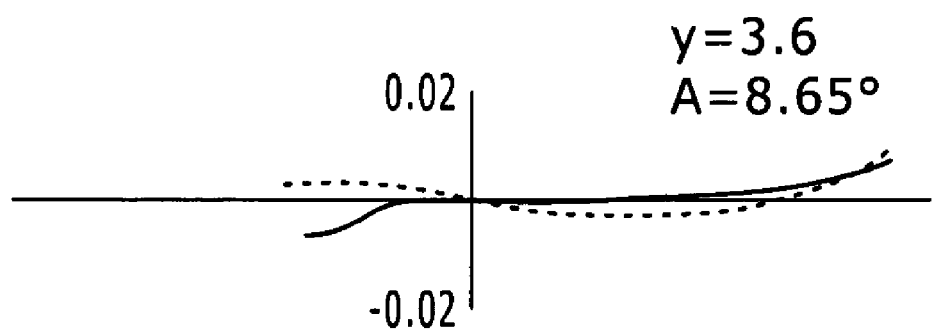
y=3.6
A=8.65°
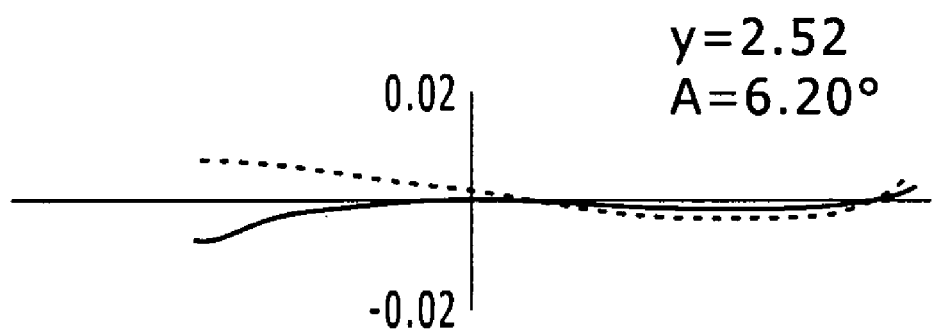
y=2.52
A=6.20°
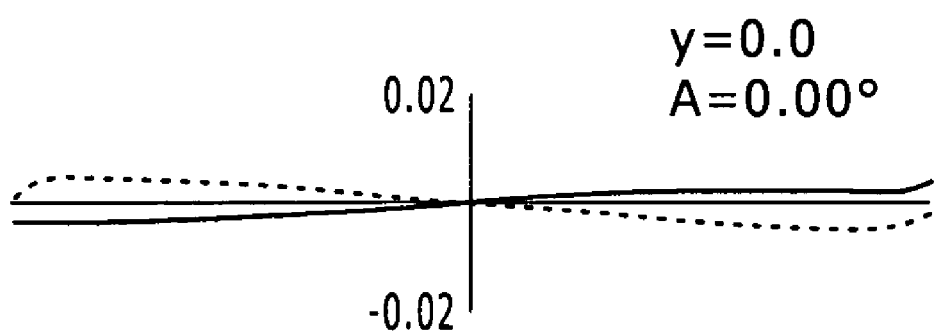
y=0.0
A=0.00°
TRANSVERSE
ABERRATION

FIG.12
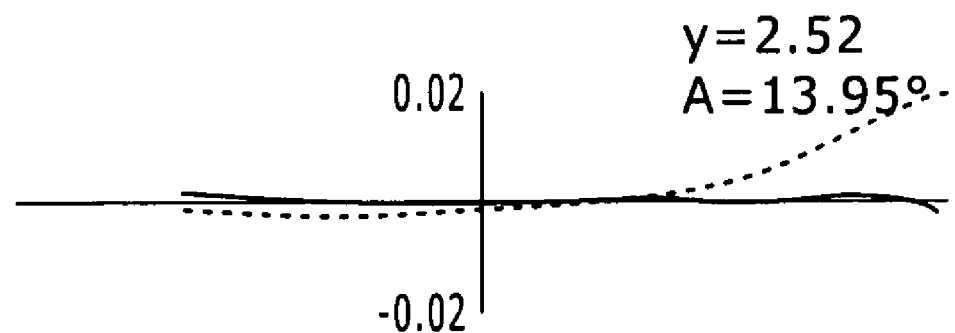
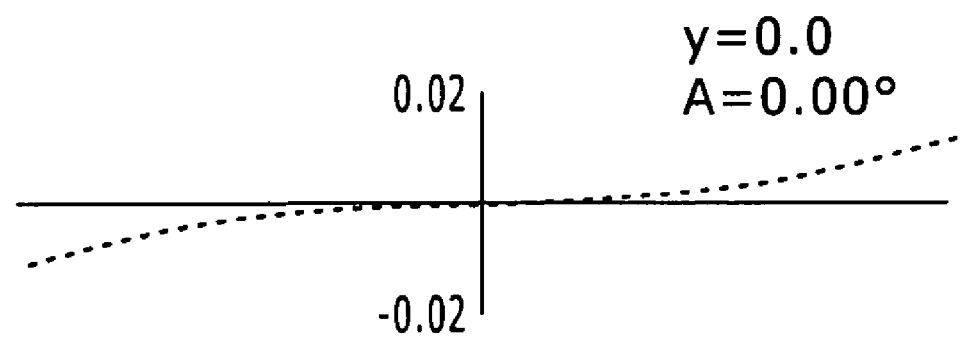
TRANSVERSE ABERRATION

TRANSVERSE ABERRATION

ZOOM LENS AND IMAGE-CAPTURE DEVICE

BACKGROUND OF THE INVENTION

1. Field of the Invention

The present invention relates to a new zoom lens and a new image-capture device. More particularly, the present invention is suitable for an image-capture device using a solid-state image-capture element, such as a digital still camera and a video camera.

2. Description of Related Art

Image-capture devices using a solid-state image-capture element, such as digital still cameras have become popular in recent years. As the image-capture devices using the solid-state image-capture element become popular, the higher image quality is required. A lens for photo shooting, particularly a zoom lens having excellent image forming performance corresponding to a solid-state image-capture element having a large number of pixels is demanded particularly with respect to the digital still camera or the like using an image-capture element having a large number of pixels. Due to increased demand for downsizing and thinning of lens, a high-performance zoom lens having a small size and a small thickness is needed. Recently, the higher magnification of image-capture lenses has been demanded. On the other hand, there is now extremely strong demand for the wide view angle of the lens for photo shooting.

In response to the above-mentioned demands, in the zoom lenses described in Japanese Unexamined Patent Application Publications No. 2005-181635 (Patent Document 1) and No. 2005-215165 (Patent Document 2), a considerable thickness reduction in the optical axis direction by inserting a prism for bending a light path into the optical system is achieved.

However, in the techniques described in the Patent Document 1 and the Patent Document 2, to achieve the smaller size and the higher magnification of the optical system, it is necessary to increase the refractive index of the reflecting prism, and the upper limit of the refractive index becomes the technical limit. Particularly, in widening the shooting view angle, it is extremely difficult to further reduce the size of the optical system. Further, there is an issue that high refractive glass used in the prism is expensive and hence the manufacturing cost is liable to be increase.

Due to the foregoing circumstances, the techniques described in the Patent Document 1 and the Patent Document 2 fail to sufficiently widen the shooting view angle, thus failing to achieve the compatibility between the sufficient reduction in thickness and the widening of angle in the zoom lenses.

SUMMARY OF THE INVENTION

Although the various techniques are employed in the related art zoom lenses described above, none of these achieves any zoom lens satisfying both wide view angle and high magnification, exhibiting high optical performance over the entire zoom range, and having a small size and a small thickness.

Typically, there is the tendency that the widening of the shooting view angle of the optical system increases the front lens diameter. Particularly, in the bent optical system using a reflecting prism, the increased sizes of the front lens and the prism in accordance with the widening of the shooting view angle will directly linked to an increase in the lens barrel size in its thickness direction (in the direction of the incident optical axis), whereby compatibility between realization of wide angle and small thickness is made difficult.

Accordingly, it is desirable to provide a zoom lens which has a wide view angle sufficient for the shooting view angle at the wide angle end, as well as high magnification, and also has an extremely small thickness and high optical performance over the entire zoom range, and which is suitable for an image-capture device using a solid-state image-capture element, such as a digital still camera and a digital video camera. An image-capture device using the zoom lens is also provided in embodiments of the present invention.

The zoom lens of one embodiment of the present invention includes a plurality of lens groups having at least first, second and third lens groups arranged in order from the object side. The first lens group has a positive refractive power which is fixed when the magnification is changed. The second lens group has a negative refractive power which is shifted to the image side when the magnification is changed from the wide angle end to the telescopic end. The third lens group has a positive refractive power which is firmly secured when the magnification is changed. The first lens group is configured by arranging, in order from the object side, a single lens having a negative refractive power, a prism having a reflection surface to bend a light path by 90°, and at least one single lens having a positive refractive power. The prism has a positive refractive power, and the image side surface thereof has a convex surface directed to the image side.

The image-capture device of one embodiment of the present invention includes the zoom lens of an embodiment of the present invention, and a solid image-capture element to convert an optical image formed by the zoom lens into electrical signals.

According to the present invention, the zoom lens has the wide view angle sufficient for the shooting view angle at the wide angle end, as well as high magnification, an extremely small thickness and high optical performance over the entire zoom range.

BRIEF DESCRIPTION OF THE DRAWINGS

FIG. 2 shows the longitudinal aberrations (spherical aberration, astigmatism and distortion) in the wide angle end state;

FIG. 7 shows the transverse aberration in the telescopic end state;

FIG. 9 shows the longitudinal aberrations (spherical aberration, astigmatism and distortion) in the wide angle end state;

FIG. 12 shows the transverse aberration in the middle focal length end state;

DETAILED DESCRIPTION OF THE PREFERRED EMBODIMENTS

Figure 1:
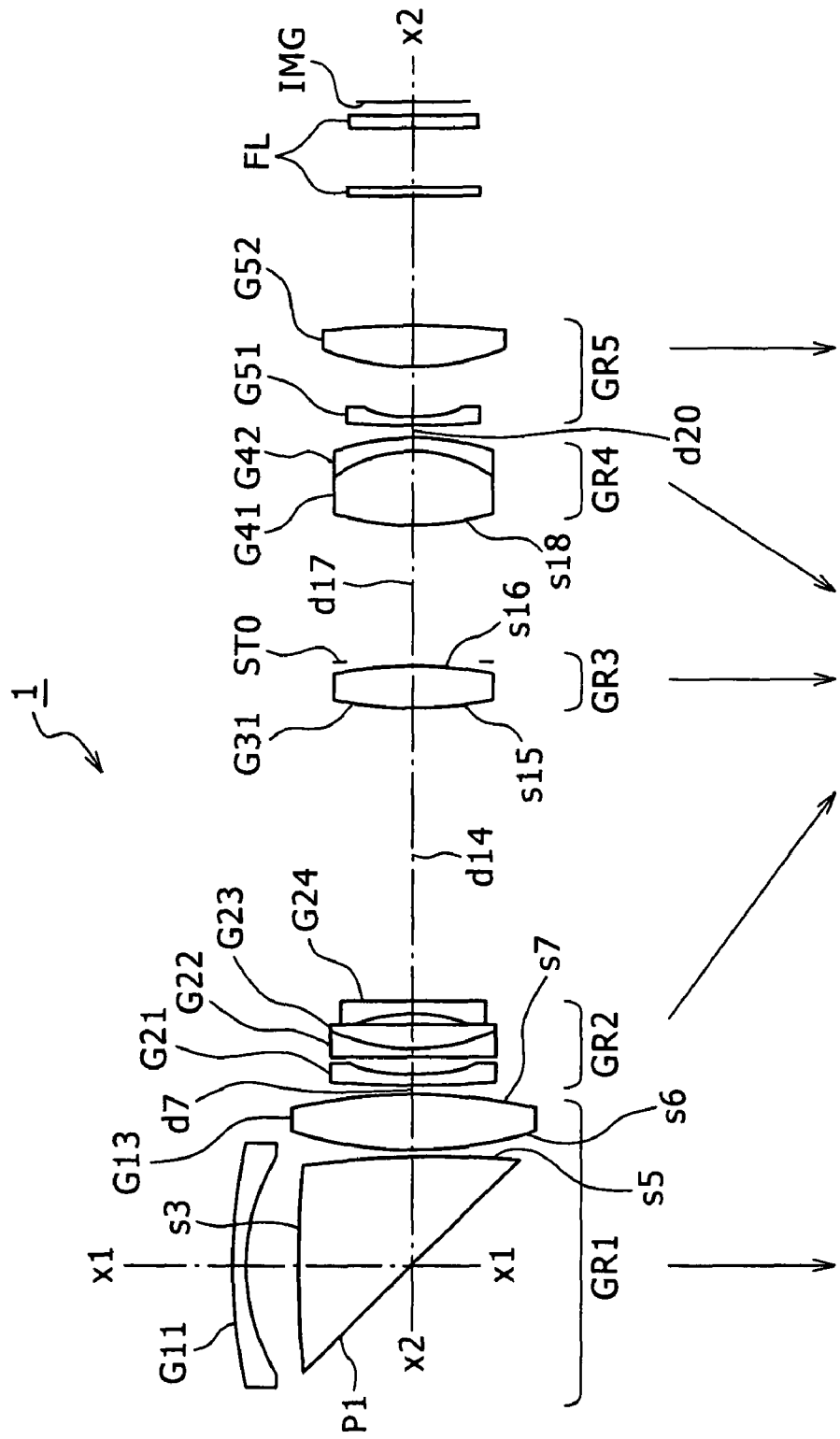
FIG. 1 is a diagram showing the lens configuration of a zoom lens according to a first embodiment of the present invention.

Embodiments for practicing the zoom lens and the image-capture device according to the present invention will be described with reference to the accompanying drawings.

Firstly, the zoom lens of the present invention will be described below.

The zoom lens of the invention includes a plurality of lens groups having at least first, second and third lens groups arranged in order from the object side. That is, the first lens group has a positive refractive power which is firmly secured when the magnification is changed. The second lens group has a negative refractive power which is shifted to the image side when the magnification is changed from the wide angle end to the telescopic end. The third lens group has a positive refractive power which is firmly secured when the magnification is changed. The first lens group is configured by arranging, in order from the object side, a single lens having a negative refractive power, a prism having a reflection surface to create a 90° bend in a light path, and at least one single lens having a positive refractive power. The prism has a positive refractive power, and the image side surface thereof has a convex surface faced the image side.

The zoom lens of the present invention has a wide view angle sufficient for the shooting view angle at the wide angle end, as well as high magnification, an extremely small thickness and high optical performance over the entire zoom range.

Firstly, the first lens group having a size and a weight greater than other lens groups is firmly secured when the magnification is changed. The above is aimed to downsize a lens barrel and reduce the load of a drive mechanism. The single lens having the negative refractive power and the prism having the reflection surface to create a 90° bend in the light path are arranged in the first lens group, thereby minimizing the lens thickness in the incident optical axis direction. Further, the second lens group has the negative refractive power, and the entrance pupil position of the entire lens system is brought near to the object side. These enable to minimize the size of the prism in the first lens group, and also reduce the thickness in the incident optical axis direction.

Due to the prism in the first lens group which has the convex surface directed to the image side, the optical system within the prism can have the configuration similar to the afocal system, and the tilt of primary ray can be reduced to enable a reduction in diameter of front lens and diameter of the prism. The above-described shape in which the convex surface of the prism is directed to the image side allows making the tilt of the primary ray having a wide view angle gentle, thereby facilitating to make the aberration corrections in the subsequent and thereafter lens systems easy.

That is, when the ejection surface of the reflecting prism does not have the convex shape facing the image side as in the related art zoom lenses having the reflecting prism for bending the light path, in order to reduce the size of the optical system, it becomes necessary to increase the refractive index of the reflecting prism, and the upper limit of the refractive index becomes the technical limit. It is thus extremely difficult to reduce the size of the optical system particularly when widening the shooting view angle. In the zoom lens of the present invention, the above-mentioned shape of the reflecting prism enables downsizing of the optical system without increasing the refractive index of the prism.

From the reason described above, plastic material having difficulties in increasing the refractive index in terms of the composition reason may be used as the material of the prism. Therefore, the prism in the first lens group in the zoom lens of the present invention may be formed by glass mold, but on the other hand, by using plastic which is low in material cost and excellent in mass productivity, it becomes easy and inexpensive to use the reflecting prism having an aspherical surface. Furthermore, the plastic material is lighter than glass, thereby enabling the zoom lens of the present invention to have a light weight in addition to a small size, a wide angle and high magnification.

In the zoom lens of one embodiment of the present invention, the lens and the prism constituting the first lens group preferably satisfy the following conditional expression (1):

$$\nu 1p - \nu 1n > 15 \qquad (1)$$

$\nu 1p$ is the average value of the Abbe's number at the prism in the first lens group and at the d line (the wavelength is equal to 587.6 nm) of the positive lens arranged on the image side of the prism; and $\nu 1n$ is the Abbe's number at the d line of the negative lens arranged at a position most near to the object side in the first lens group.

The conditional expression (1) is the equation which defines a difference between the Abbe's number of the negative lens constituting the first lens group, and the average value of the Abbe's number of the prism and the positive lens arranged thereafter. When the difference of Abbe's number becomes small by exceeding the lower limit value, it becomes difficult to sufficiently correct the chromatic aberration of magnification occurred in the first lens group, thereby resulting in degradation of the image quality. It is most preferable to satisfy the following conditional expression, (1') $\nu 1 p - \nu 1 n > 30$. This further enhances the effect of correction. Alternatively, the above-mentioned chromatic aberration of magnification may be corrected by electrical signal processing after capturing the image.

As the most preferred embodiment of the first lens group, the object side surface of the negative lens which constitutes the first lens group, and is arranged at a position most near to the object side may preferably have a convex shape facing toward the object side. This enables to minimize the barrel distortion which is liable to occur at the surface most near to the object side in the first lens group when the shooting view angle is widened. In the zoom lens according to an embodiment of the present invention, the prism in the first lens group preferably has an aspherical surface on at least one surface.

The lens configuration for reducing the tilt of the primary ray by using the negative lens and the prism having the convex surface directed to the image size as described above is extremely effective in downsizing the wide angle and the front lens. However, due to generation of a large barrel distortion at the wide angle end, it is difficult to make the correction in the subsequent or thereafter lens system by maintaining the small size. From this reason, by making at least one surface of the prism to the aspherical surface, the distortion at the wide angle end and the spherical aberration at the telescopic end may be corrected efficiently. As the most preferable embodiment, the aspherical surface is provided on both the object side and the image side of the prism. This further improves the effect of the aberration correction.

Alternatively, the above-mentioned distortion may be corrected by electrical signal processing after capturing the image.

In the zoom lens of an embodiment of the present invention, the third lens group preferably has an aperture, and the position of the aperture is firmly secured during the magnification change. This reduces both the size of the lens barrel and the load of the drive mechanism.

In the zoom lens of an embodiment of the present invention, the second lens group is preferably configured by the following four lenses, in order from the object side, a lens having a negative refractive power, a lens having a negative refractive power, a lens having a positive refractive power, and a lens having a negative refractive power.

In the zoom lens of the present invention, when the magnification is changed from the wide angle end to the telescopic end, the second lens group is shifted from the object side to the image side, thereby functioning as a variator. The high magnification naturally requires enhancement of the refractive power of the second lens group. Therefore, to achieve the small size and the high magnification of the optical system, it becomes necessary to make the corrections as much as possible to the various aberrations occurred in the second lens group when the magnification is changed.

With this in view, by arranging the configuration of the second lens group as described above, the aberration variations during the magnification change is suppressed, and thereby achieving both the small size and the high magnification at the same time.

As the most preferred embodiment of the second lens group, the negative lens positioned at the second position from the object side and the positive lens arranged at the third position are joined together. This enables the suitable correction of the chromatic aberration occurred in the second lens group and the prevention of the axial misalignments of the lenses to be joined. This also facilitates the assembly of the second lens group to the lens barrel.

Preferably, in the zoom lens of an embodiment of the present invention, it is preferable that the image is formed on a solid-state image-capture element.

Preferably, the zoom lens of an embodiment of the present invention includes first to fifth lens groups arranged in order from the object side. That is, the first lens group has a positive refractive power which is firmly secured when the magnification is changed. The second lens group has a negative refractive power which is shifted to the image side when the magnification is changed from the wide angle end to the telescopic end. The third lens group has a positive refractive power which is firmly secured when the magnification is changed. The fourth lens group has a positive refractive power which is shifted to the object side when the magnification is changed from the wide angle end to the telescopic end. The fifth lens group has a negative refractive power which is firmly secured when the magnification is changed. The first lens group is configured by arranging, in order from the object side, a single lens having a negative refractive power, a prism having a reflection surface to create a 90° bend in a light path, and at least one single lens having a positive refractive power. It is preferable that the prism has a positive refractive power, and the image side surface thereof has a convex surface facing the image side.

This allows realization of the small-sized zoom lens capable of shooting at high magnification. In this case, it is preferable that at least one surface of the respective surfaces of the lenses constituting the third lens group is preferably formed by an aspherical surface. Especially, it is preferable that at least one surface of the lens in the third lens group which is arranged at a position most near to the object side is formed by an aspherical surface. This enables the efficient correction to the spherical aberration at the wide angle end.

Specific embodiments of the zoom lens of the present invention will be described below.

The following embodiments include one whose lens surface is formed by an aspherical surface. The aspherical surface shape is defined by the following equation 1.

$$x = cy^2/(1+(1\cdot(1+k)c^2y^2)^{1/2}) + Ay^4 + By^6 + \ldots \qquad \text{[Equation 1]}$$

where "x" is a distance from a lens surface vertex in the optical axis direction, "y" is a height in the direction perpendicular to the optical axis, "c" is a paraxial curvature at lens vertex, "k" is a conic constant, and "A, B, . . ." are aspherical surface coefficients.

FIG. 1 is a diagram showing the lens configuration according to a first embodiment of the zoom lens of the present invention. A zoom lens 1 is configured by arranging, in order from the object side, a first lens group GR1 having a positive refractive power, a second lens group GR2 having a negative refractive power, a third lens group GR3 having a positive refractive power, a fourth lens group GR4 having a positive refractive power and a fifth lens group GR5 having a negative refractive power. FIG. 1 shows the positions of the respective optical elements in the wide angle end state. When the magnification is changed from the wide angle end state to the telescopic end state, the first, third and fifth lens groups GR1, GR3 and GR5 are firmly secured, and the second lens group GR2 is shifted to the image side along an optical axis x (x2), and the fourth lens group GR4 is shifted to the object side along the optical axis x (x2). The third lens group GR3 is provided with a stop STO on the image side. A filter FL, such as a low-pass filter is arranged between the fifth lens group GR5 and an image surface IMG.

The first lens group GR1 includes, in order from the object side, a negative meniscus lens G11 with its convex surface directed to the object side, a reflecting prism P1, whose surfaces (the incident surface and the exit surface) are convex and shaped aspherically so as to bend the optical axis (the light entered along an incident optical axis x1 is directionally changed by 90° at the reflection surface, and travels along the optical axis x2 up to the image surface IMG), and a positive lens G13 of double-convex shape and double-aspherical surface. The second lens group GR2 includes, in order from the object side, a negative meniscus lens G21 with a convex surface directed to the object side, a negative joined lens consisting of a negative lens G22 of double-concave shape and a positive lens G23 with a convex surface directed to the object side, and a negative meniscus lens G24 with a concave surface directed to the object side. The third lens group GR3 includes, in order from the object side, a positive lens G31 of double-convex shape having double-aspherical surface, and a stop STO. The fourth lens group GR4 includes, in order from the object side, a positive lens G41 of double-convex shape having an aspherical surface on the object side, and a negative meniscus lens G42 with a convex surface directed to the image side. The fifth lens group GR5 includes, in order from the object side, a negative meniscus lens G51 with a convex surface directed to the object side, and a positive lens G52 of double-convex shape.

Table 1 shows the lens data of a numerical value example 1, in which specific numerical values are applied to the zoom lens 1 according to the first embodiment. In the following tables, "si(i=1, 2, 3, . . . )" indicates the i-th surface from the object side, "ri" indicates the radius of curvature of the i-th lens surface from the object side, "di" indicates the spacing between the i-th surface and the (i+1)-th surface from the object side on the optical axial, "ni" indicates the refractive index against the d line of the i-th surface from the object side, "vi" indicates the Abbe's number with respect to the d line of the i-th surface from the object side, "f" indicates the focal length of the entire lens system, "Fno" indicates a full aperture F value, and "ω" indicates a half view angle. In the above-mentioned "si," "ASP" indicates that the surface is an aspherical surface, and "REF" indicates that the surface is a reflection surface. In the above-mentioned "ri," "INFINITY" indicates the surface is a plane surface, and "STO" indicates a stop. In the above-mentioned "di," (di)" indicates that the spacing between the surfaces is variable.

TABLE 1 f = 4.79 to 22.71, FNo = 3.78 to 4.52, ω = 38.28 to 8.65

| si | ri | di | ni | vi |
|---|---|---|---|---|
| 1 | 37.361 | 0.500 | 2.00069 | 25.46 |
| 2 | 9.769 | 2.151 | | |
| 3 (ASP) | 4.00.E+04 | 4.775 | 1.52500 | 56.20 |
| 4 (ASP) | INFINITY | 4.775 | 1.52500 | 56.20 |
| 5 (ASP) | −24.613 | 0.200 | | |
| 6 (ASP) | 16.500 | 2.230 | 1.59201 | 67.02 |
| 7 (ASP) | −27.652 | (d7) | | |
| 8 | 32.045 | 0.419 | 1.90366 | 31.32 |
| 9 | 7.256 | 0.868 | | |
| 10 | −88.800 | 0.300 | 1.69350 | 53.34 |
| 11 | 7.312 | 1.124 | 1.94595 | 17.98 |
| 12 | 127.000 | 0.440 | | |
| 13 | −11.235 | 0.473 | 1.75520 | 27.53 |
| 14 | 83.425 | (d14) | | |
| 15 (ASP) | 14.440 | 1.894 | 1.69350 | 53.20 |
| 16 (ASP) | −21.724 | 0.200 | | |
| 17 | (STO) | (d17) | | |
| 18 (ASP) | 10.628 | 3.179 | 1.59201 | 67.02 |
| 19 | −5.500 | 0.570 | 1.80610 | 33.27 |
| 20 | −10.530 | (d20) | | |

TABLE 1-continued f = 4.79 to 22.71, FNo = 3.78 to 4.52, ω = 38.28 to 8.65

| si | ri | di | ni | vi |
|---|---|---|---|---|
| 21 | 31.383 | 0.387 | 2.00069 | 25.46 |
| 22 | 5.624 | 1.991 | | |
| 23 | 11.135 | 1.790 | 1.49700 | 81.61 |
| 24 | −45.327 | 5.735 | | |
| 25 | INFINITY | 0.300 | 1.52300 | 58.60 |
| 26 | INFINITY | 2.350 | | |
| 27 | INFINITY | 0.500 | 1.55671 | 58.56 |
| 28 | INFINITY | 0.600 | | |

In the zoom lens 1, the magnification change from the wide angle end state to the telescopic end state causes changes in the following spacing: spacing d7 between the first and second lens groups GR1 and GR2, spacing d14 between the second and third lens groups GR2 and GR3, spacing d17 between the third and fourth lens groups GR3 and GR4, and spacing d20 between the fourth and fifth lens groups GR4 and GR5. Table 2 shows the values under the wide angle end having above-mentioned respective spacing (f=4.79), the middle focal length (f=10.87) and the telescopic end (f=22.71) in the numerical value example 1.

TABLE 2

| | f | | |
|---|---|---|---|
| | 4.79 | 10.87 | 22.71 |
| d7 | 0.458 | 8.149 | 12.874 |
| d14 | 12.634 | 4.953 | 0.500 |
| d17 | 5.828 | 3.443 | 1.000 |
| d20 | 0.532 | 2.811 | 5.065 |

In the zoom lens 1, both surfaces s3 and s5 of the reflecting prism P1, both surfaces s6 and s7 of the double convex lens G13 of the first lens group GR1, both surfaces s15 and s16 of the double convex lens G31 of the third lens group GR3, and the object side surface s18 of the double convex lens G41 of the fourth lens group GR4 are formed by the aspherical surface. Table 3 shows the 4th order, the 6th order, the 8th order and the 10th order aspherical surface coefficients A, B, C and D of the respective surfaces in the numerical value example 1, along with conic constants K. In Table 3 and the following tables indicating the aspherical surfaces, "E-i" indicates an exponential expression taking "10" as the bottom, that is, "$10^{-i}$." For example, "0.12345E-05" indicates "$0.12345 \times 10^{-5}$."

TABLE 3

| si | K | A | B | C | D |
|---|---|---|---|---|---|
| 3 | −3.27550 | 1.57343E−04 | −1.04566E−06 | 1.48855E−08 | −2.69615E−10 |
| 5 | −7.35104 | 2.63614E−04 | −3.04861E−06 | −1.35431E−07 | 1.52047E−09 |
| 6 | 1.47213 | 4.90784E−05 | 1.72603E−06 | −4.89760E−08 | 2.42631E−11 |
| 7 | 5.47482 | −1.49428E−04 | 8.69062E−06 | −4.42315E−08 | −6.02755E−10 |
| 15 | −16.66030 | 5.77236E−05 | −3.63069E−05 | −8.37823E−07 | −4.90414E−09 |
| 16 | 15.62558 | −3.47778E−04 | −6.95884E−06 | −1.55604E−06 | 3.39121E−08 |
| 18 | −0.94317 | −2.73184E−04 | 6.06674E−06 | −1.79591E−07 | 1.75068E−08 |

Table 4 shows the value corresponding to the conditional expression (1) in the numerical value example 1.

TABLE 4

| (1) | v1p − v1n | 36.15 |
|---|---|---|

Figure 2:
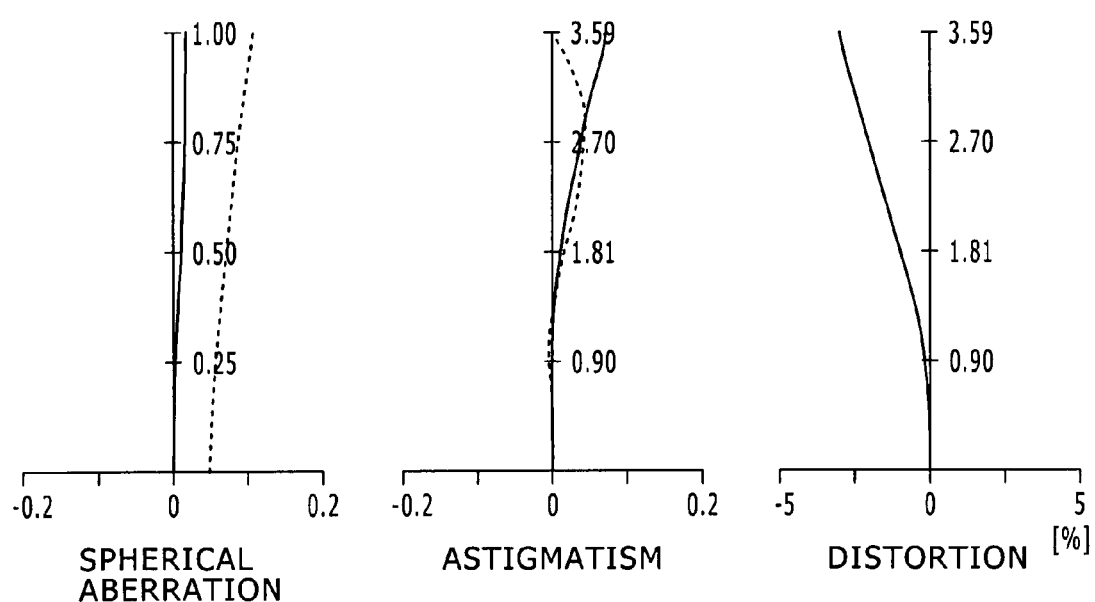
FIG. 2 shows, along with FIGS. 3 to 7, the various aberrations of a numerical value example 1, in which specific numerical values are applied to a zoom lens in the first embodiment.
Figure 3:
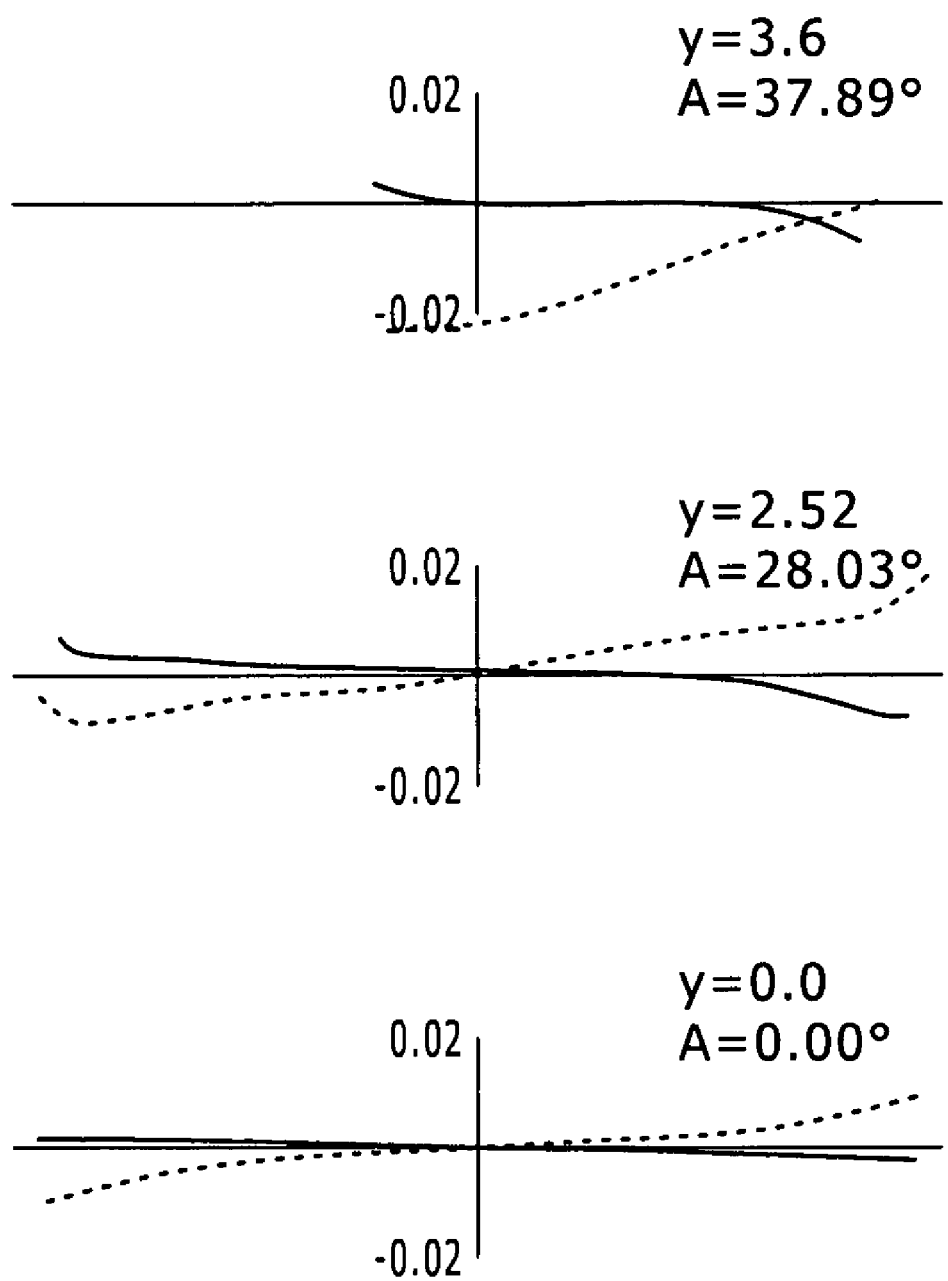
FIG. 3 shows the transverse aberration in the wide angle end state.
Figure 4:
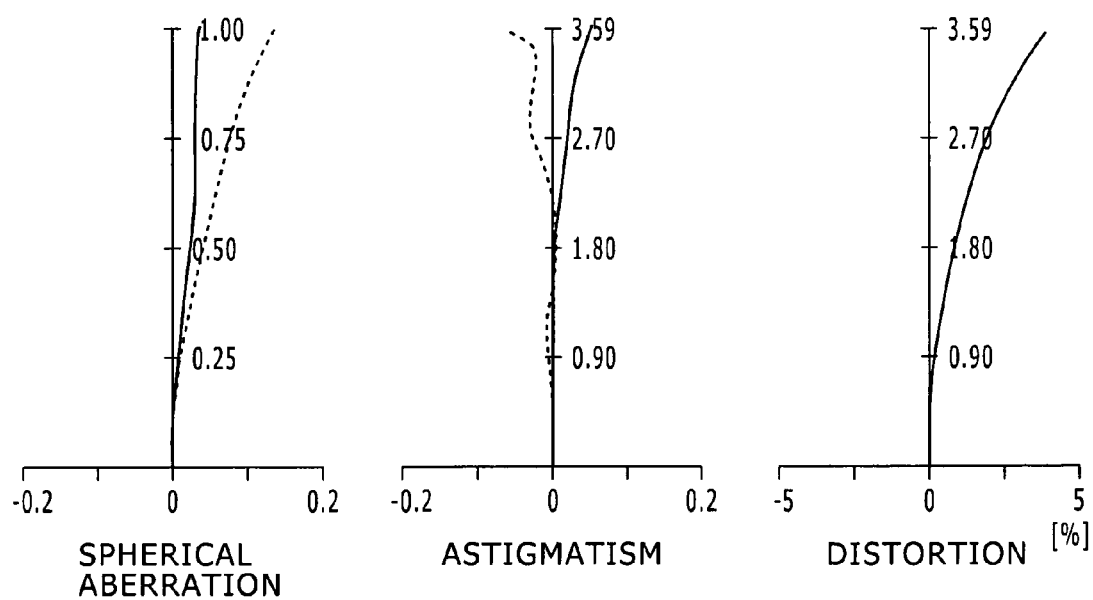
FIG. 4 shows the longitudinal aberrations (spherical aberration, astigmatism and distortion) in the middle focal length end state.
Figure 5:
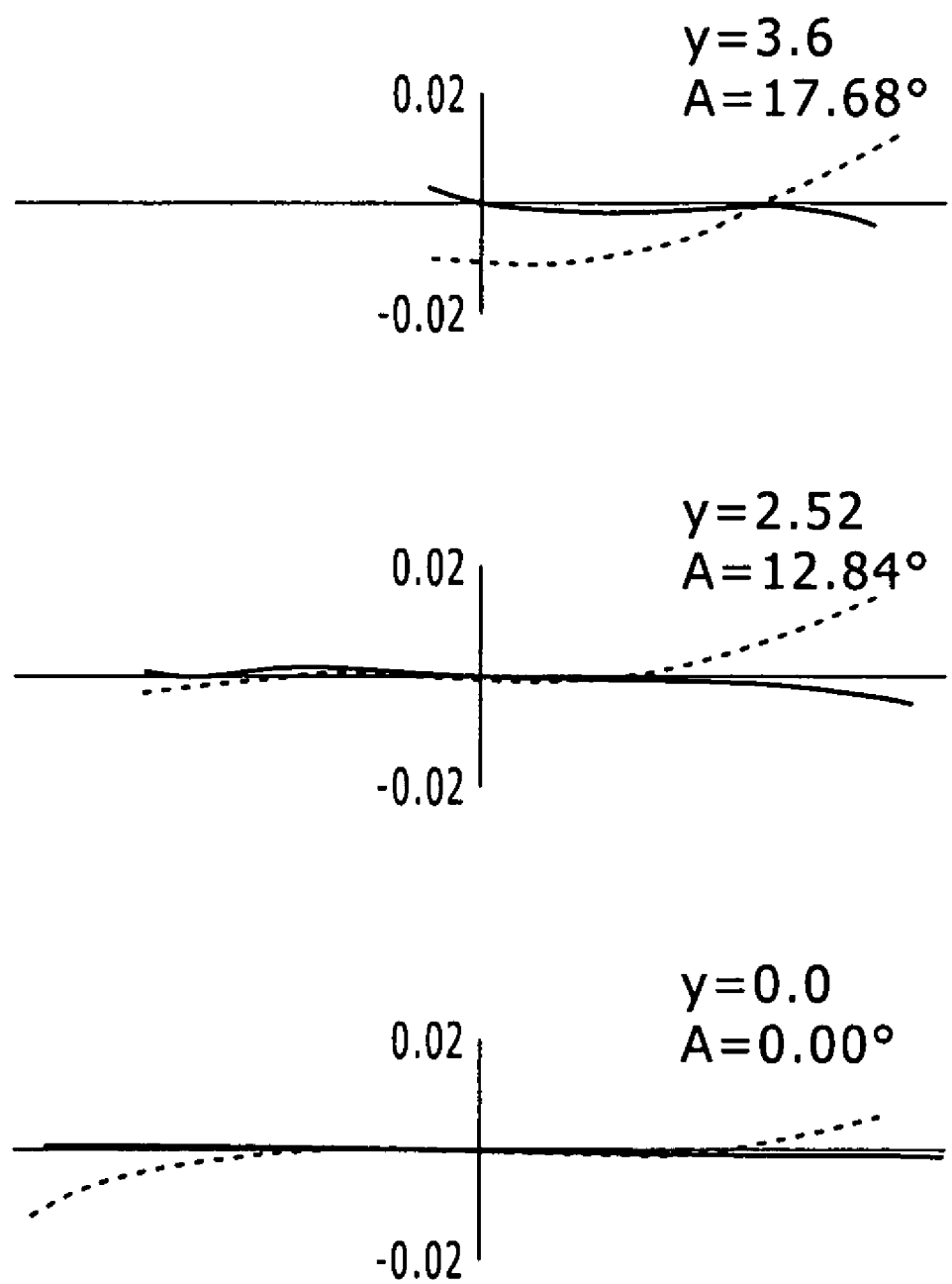
FIG. 5 shows the transverse aberration in the middle focal length state.
Figure 6:
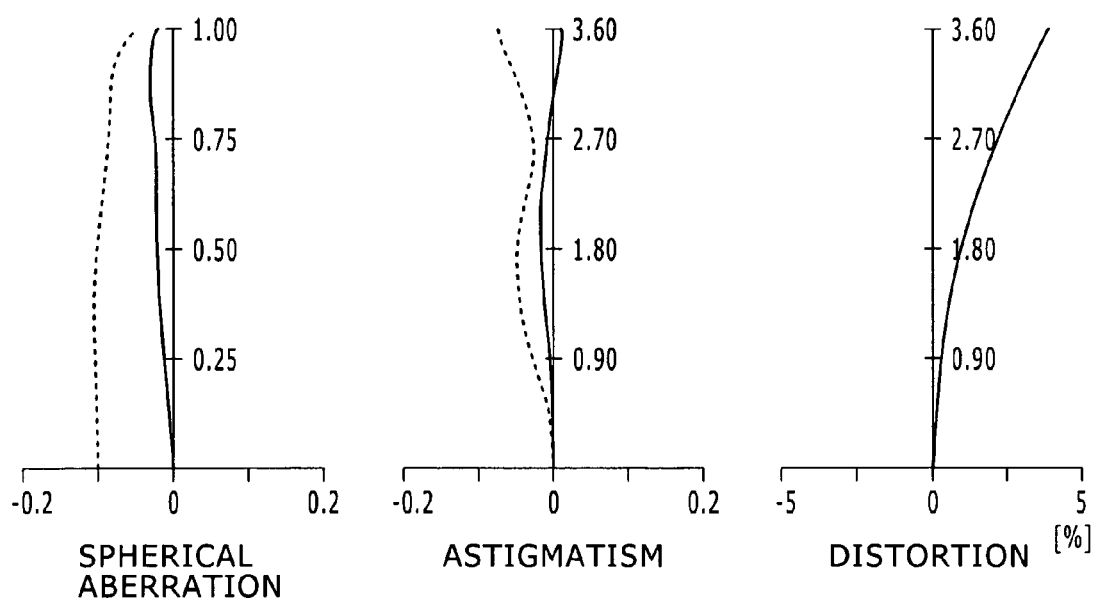
FIG. 6 shows the longitudinal aberrations (spherical aberration, astigmatism and distortion) in the telescopic end state.

FIGS. 2 to 7 show the respective aberration diagrams in the numerical value example 1. FIG. 2 shows the longitudinal aberrations (spherical aberration, astigmatism and distortion) at the wide angle end position. FIG. 3 shows the transverse aberration at the wide angle end position. FIG. 4 shows the longitudinal aberrations (spherical aberration, astigmatism and distortion) at the middle focal position. FIG. 5 shows the transverse aberration at the middle focal position. FIG. 6 shows the longitudinal aberrations (spherical aberration, astigmatism and distortion) at the telescopic end position. FIG. 7 shows the transverse aberration at the telescopic end position. In each aberration diagrams, with respect to the spherical aberration, the distortions and the transverse aberration, the solid line represents the values on the d line, and the dotted line represents the values on the g line (the wavelength is equal to 435.8 nm). The astigmatism diagrams show the values on the d line, and the solid line represents the values on the sagittal image surface, and the broken line represents the values on the meridional image surface.

It can be seen from all the respective aberration diagrams that the numerical value example 1 exhibits well balanced corrections to the individual aberrations at the wide angle end position, at the middle focal position between the wide angle end and the telescopic end, and at the telescopic end position.

Figure 8:
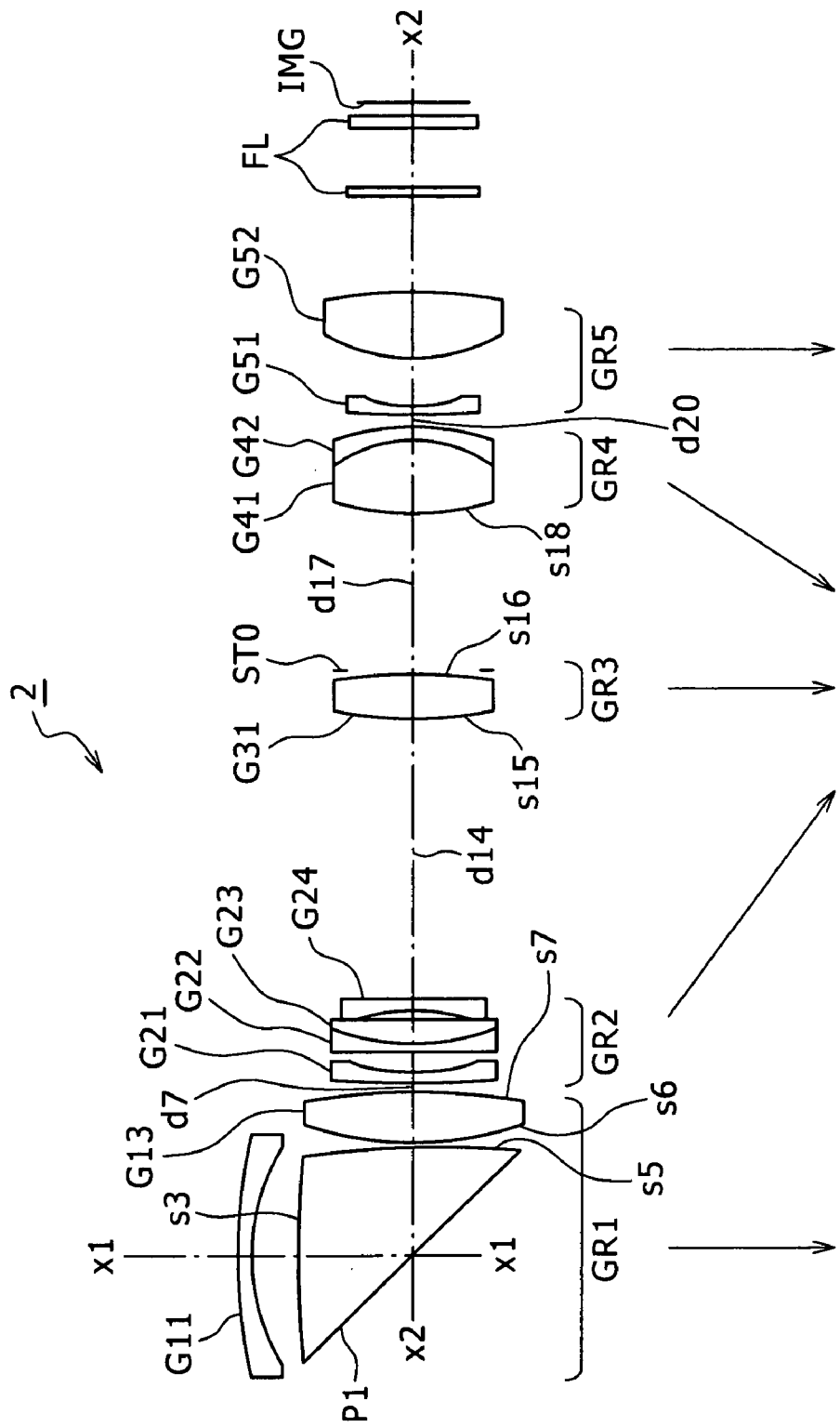
FIG. 8 is a diagram showing the lens configuration of a zoom lens according to a second embodiment of the present invention.

FIG. 8 shows the lens configuration according to a second embodiment of the zoom lens of the present invention. A zoom lens 2 is configured by arranging, in order from the object side, a first lens group GR1 having a positive refractive power, a second lens group GR2 having a negative refractive power, a third lens group GR3 having a positive refractive power, a fourth lens group GR4 having a positive refractive power and a fifth lens group GR5 having a negative refractive power. FIG. 8 also shows the positions of the respective optical elements at the wide angle end state. When the magnification is changed from the wide angle end state to the telescopic end state, the first, third and fifth lens groups GR1, GR3 and GR5 are firmly secured, and the second lens group GR2 is shifted to the image side along an optical axis x (x2), and the fourth lens group GR4 is shifted to the object side along the optical axis x (x2). The third lens group GR3 is provided with a stop STO on the image side. A filter FL such as a low-pass filter is arranged between the fifth lens group GR5 and an image surface IMG.

The first lens group GR1 includes, in order from the object side, a negative meniscus lens G11 with a convex surface directed to the object side, a reflecting prism P1 whose both surfaces (the incident surface and the exit surface) are convex surfaces and shaped aspherically so as to bend the optical axis (the light entered along an incident optical axis x1 is directionally changed by 90° from the reflection surface and travels along the optical axis x2 up to the image surface IMG), and a positive lens G13 of double-convex shape having double-aspherical surfaces. The second lens group GR2 includes, in order from the object side, a negative meniscus lens G21 with a convex surface directed to the object side, a negative joined lens consisting of a negative lens G22 of double-concave shape and a positive lens G23 with its convex surface directed to the object side, and a negative meniscus lens G24 with a concave surface directed to the object side. The third lens group GR3 includes, in order from the object side, a positive lens G31 of double-convex shape having double-aspherical surface, and a stop STO. The fourth lens group GR4 is a positive joined lens configured by arranging, in order from the object side, a positive lens G41 of double-convex shape having an a spherical surface at the object side, and a negative meniscus lens G42 with a convex surface directed to the image side. The fifth lens group GR5 includes, in order from the object side, a negative meniscus lens G51 with a convex surface directed to the object side, and a positive lens G52 of double-convex shape.

Table 5 shows the lens data of a numerical value example 2, in which specific numerical values are applied to the zoom lens 2 according to the second embodiment.

TABLE 5 f = 4.84 to 20.61, FNo = 3.78 to 4.54, ω = 37.90 to 9.67

| Si | ri | di | ni | vi |
|---|---|---|---|---|
| 1 | 37.288 | 0.5 | 2.00069 | 25.46 |
| 2 | 9.500 | 1.959094 | | |
| 3 (ASP) | −5.66E+04 | 4.726999 | 1.52500 | 56.20 |
| 4 (REF) | INFINITY | 4.726999 | 1.52500 | 56.20 |
| 5 (ASP) | −25.664 | 0.2 | | |
| 6 (ASP) | 16.816 | 2.46105 | 1.58913 | 61.25 |
| 7 (ASP) | −27.000 | (d7) | | |
| 8 | 33.795 | 0.387 | 1.90366 | 31.32 |
| 9 | 7.278 | 0.810893 | | |
| 10 | −75.411 | 0.3 | 1.69700 | 48.51 |
| 11 | 6.960 | 1.222544 | 1.92286 | 20.88 |
| 12 | 508.000 | 0.387 | | |
| 13 | −12.876 | 0.387 | 1.74950 | 35.04 |
| 14 | 50.400 | (d14) | | |
| 15 (ASP) | 13.364 | 1.934992 | 1.69350 | 53.20 |
| 16 (ASP) | −22.907 | 0.2 | | |
| 17 | (STO) | (d17) | | |
| 18 (ASP) | 10.111 | 3.208097 | 1.59201 | 67.02 |
| 19 | −5.537 | 0.580714 | 1.80610 | 33.27 |
| 20 | −11.290 | (d20) | | |
| 21 | 36.500 | 0.471549 | 2.00069 | 25.46 |
| 22 | 5.157 | 1.92 | | |
| 23 | 7.761 | 2.88 | 1.48749 | 70.44 |
| 24 | −43.400 | 4.28516 | | |
| 25 | INFINITY | 0.3 | 1.52300 | 58.60 |
| 26 | INFINITY | 2.35 | | |
| 27 | INFINITY | 0.5 | 1.55671 | 58.56 |
| 28 | INFINITY | 0.6 | | |

In the zoom lens 2, when the magnification change from the wide angle end state to the telescopic end state, the following spacing changes: spacing d7 between the first and second lens groups GR1 and GR2; spacing d14 between the second and third lens groups GR2 and GR3; spacing d17 between the third and fourth lens groups GR3 and GR4; and spacing d20 between the fourth and fifth lens groups GR4 and GR5. Table 6 shows the values under the wide angle end having above-mentioned respective spacing (f=4.841), the middle focal length (f=10.03) and the telescopic end (f=20.61) in the numerical value example 2.

TABLE 6

| | F | | |
|---|---|---|---|
| | 4.841 | 10.03 | 20.61 |
| D7 | 0.300 | 8.038 | 12.598 |
| d14 | 12.319 | 5.026 | 0.500 |
| d17 | 6.877 | 4.001 | 1.126 |
| d20 | 0.505 | 2.927 | 5.779 |

In the zoom lens 2, both surfaces s3 and s5 of the reflecting prism P1, both surfaces s6 and s7 of the double convex lens G13 of the first lens group GR1, both surfaces s15 and s16 of the double convex lens G31 of the third lens group GR3, and the object side surface s18 of the double convex lens G41 of the fourth lens group GR4 are formed by the aspherical surface. Table 7 shows the 4th order, the 6th order, the 8th order and the 10th order aspherical surface coefficients A, B, C and D of the respective surfaces in the numerical value example 2, along with conic constants K.

TABLE 7

| si | K | A | B | C | D |
|---|---|---|---|---|---|
| 3 | −1.24810 | 2.46532E−04 | −1.28135E−06 | 4.52341E−09 | 6.54025E−12 |
| 5 | −38.10637 | 3.50071E−04 | −1.86302E−06 | −1.84724E−07 | 1.68841E−09 |
| 6 | 2.83653 | 1.50463E−04 | 1.19605E−06 | −5.61460E−08 | 5.99577E−10 |
| 7 | 5.20177 | −2.66564E−04 | 1.21025E−05 | −1.39734E−07 | 9.22034E−10 |
| 15 | −7.09265 | −6.78820E−05 | −7.04759E−06 | −8.37823E−07 | −4.90414E−09 |
| 16 | 3.75069 | −3.01932E−04 | 6.36945E−06 | −1.73663E−06 | 3.35603E−08 |
| 18 | −0.06384 | −2.71273E−04 | 1.15481E−05 | −9.00919E−07 | 4.79162E−08 |

Table 8 shows the value corresponding to the conditional expression (2) in the numerical value example 2.

TABLE 8

| (2) | ν1p − ν1n | 33.27 |
|---|---|---|

Figure 9:
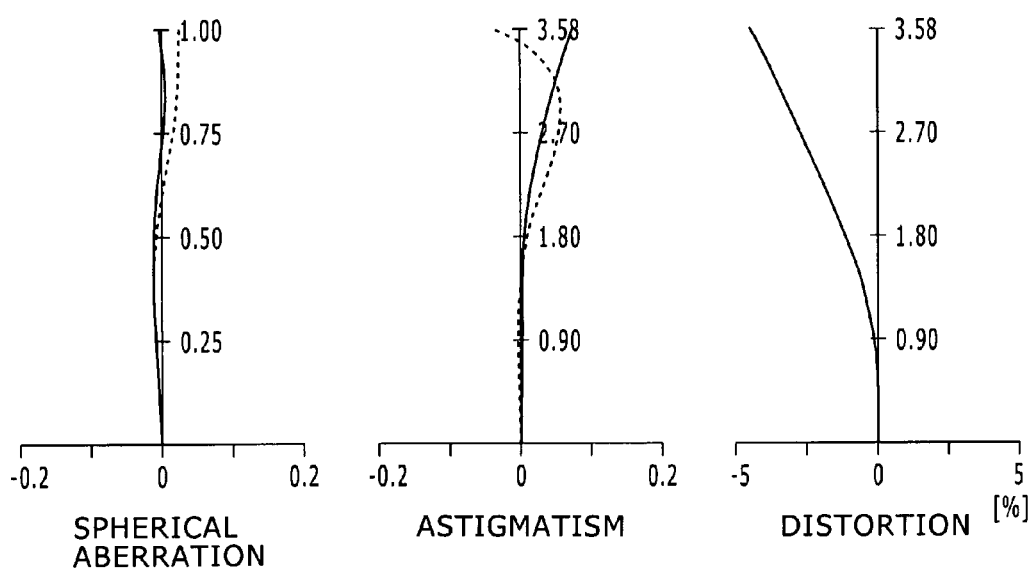
FIG. 9 shows, along with FIGS. 10 to 14, the various aberrations of a numerical value example 2, in which specific numerical values are applied to a zoom lens of the second embodiment.
Figure 10:
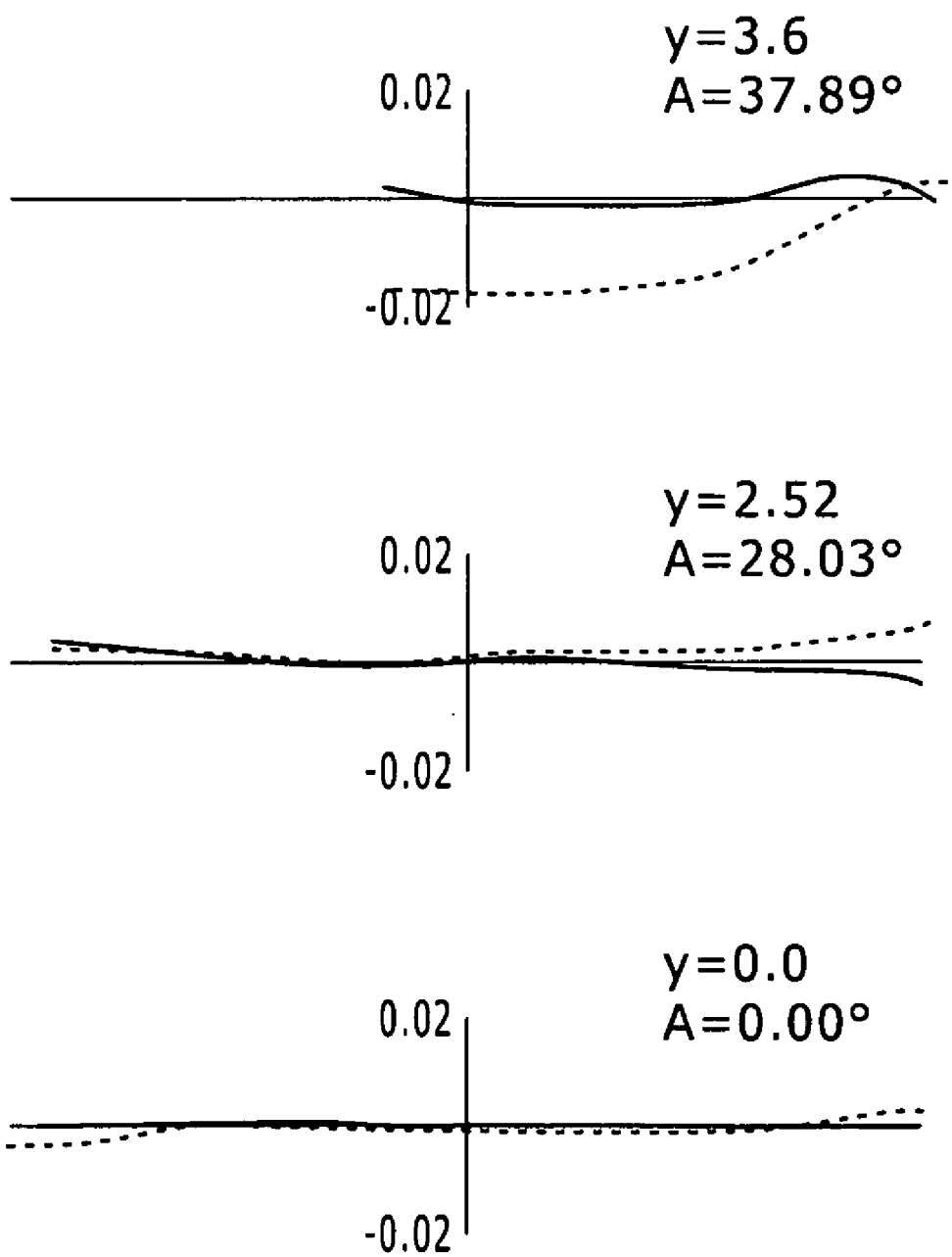
FIG. 10 shows the transverse aberration in the wide angle end state.
Figure 11:
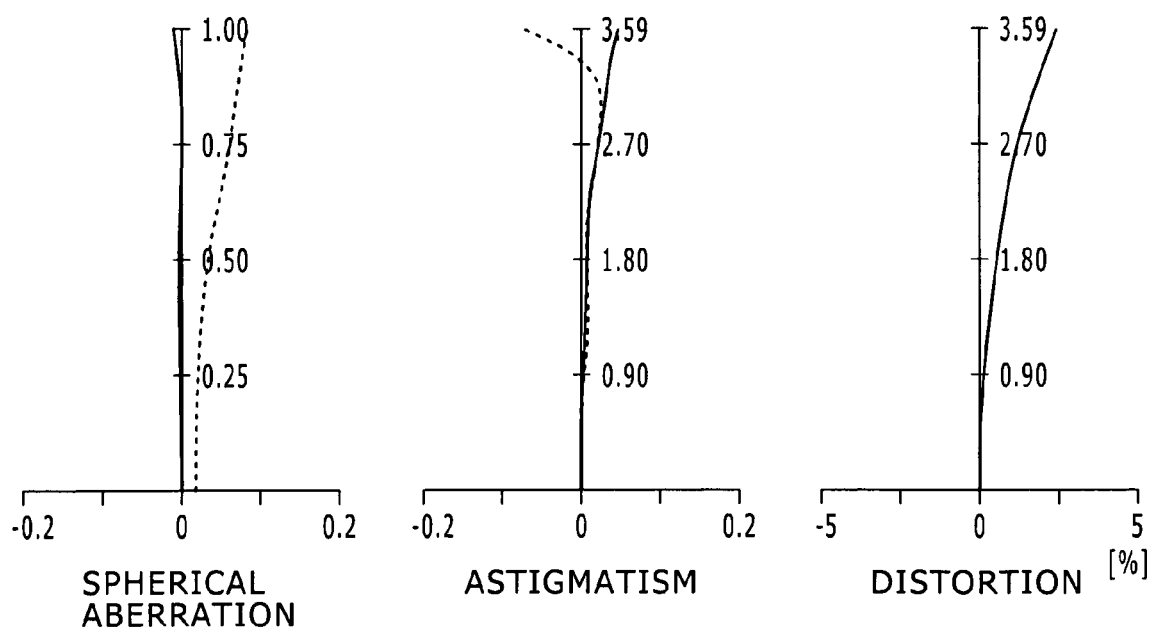
FIG. 11 shows the longitudinal aberrations (spherical aberration, astigmatism and distortion) in the middle focal length end state)
Figure 13:
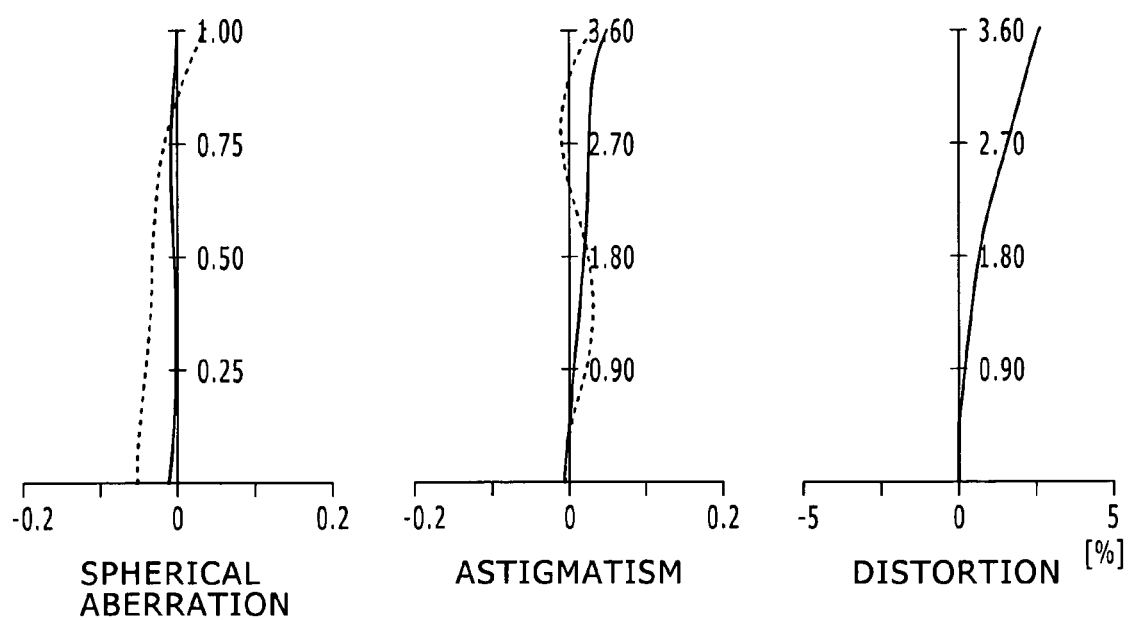
FIG. 13 shows the longitudinal aberrations (spherical aberration, astigmatism and distortion) in the telescopic end state.
Figure 14:
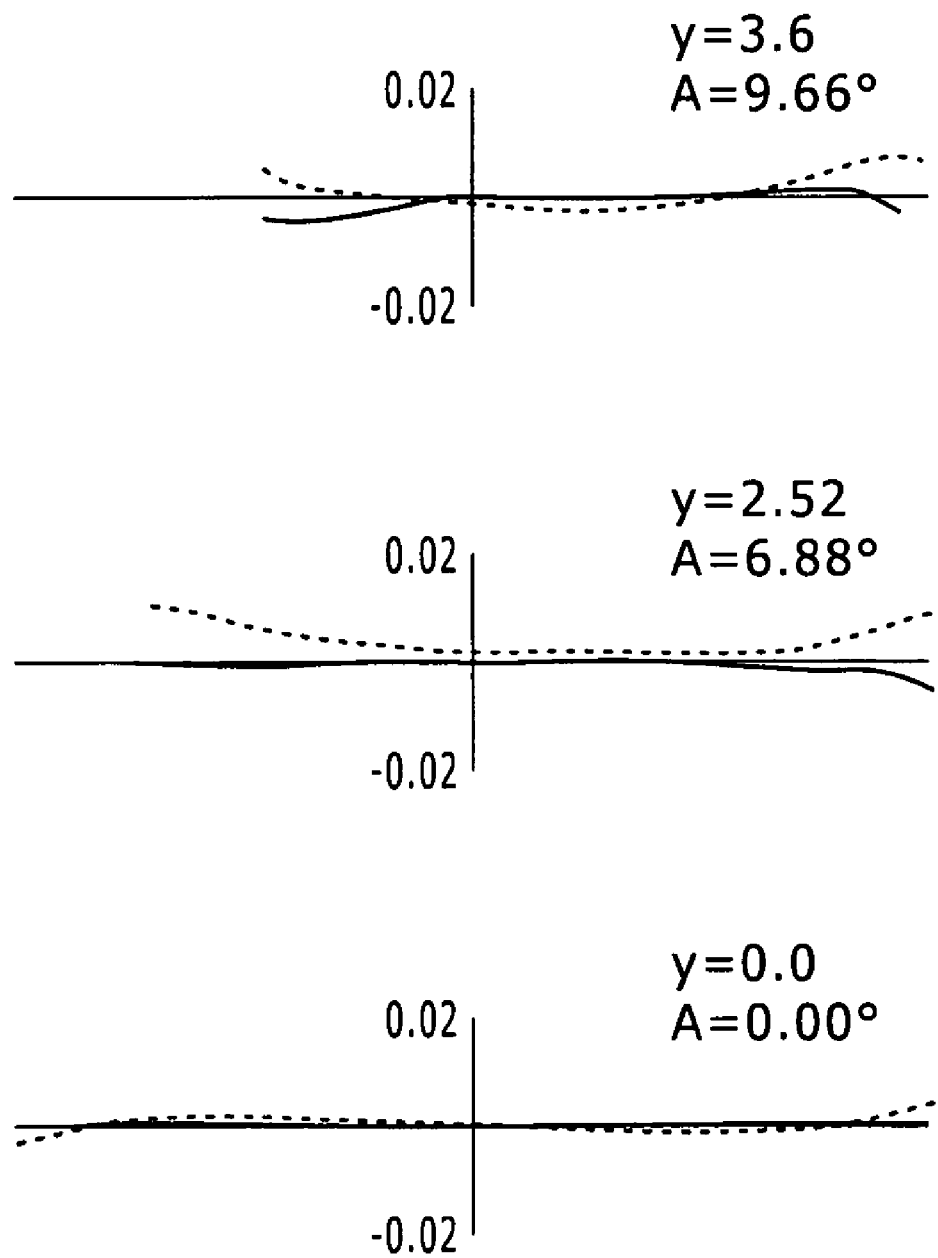
FIG. 14 shows the transverse aberration in the telescopic end state.

FIGS. 9 to 14 show the respective aberration diagrams of the numerical value example 2. FIG. 9 shows the longitudinal aberrations (spherical aberration, astigmatism and distortion) at the wide angle end position. FIG. 10 shows the transverse aberration at the wide angle end position. FIG. 11 shows the longitudinal aberrations (spherical aberration, astigmatism and distortion) at the middle focal position. FIG. 12 shows the transverse aberration at the middle focal position. FIG. 13 shows the longitudinal aberrations (spherical aberration, astigmatism and distortion) at the telescopic end position. FIG. 14 shows the transverse aberration at the telescopic end position. In the each aberration diagrams, with respect to the spherical aberration, the distortions and the transverse aberration, the solid line represents the values on the d line, and the dotted line represents the values on the g line. The astigmatism diagrams show the values on the d line, and the solid line represents the values on the sagittal image surface, and the broken line represents the values on the meridional image surface.

It can be seen from each aberration diagrams that the numerical value example 2 exhibits well balanced corrections to the individual aberrations at the wide angle end position, at the middle focal position between the wide angle end and the telescopic end, and at the telescopic position.

The image-capture device of the present invention will next be described.

The image-capture device of the present invention includes a zoom lens and a solid image-capture element for converting the optical image formed by the zoom lens into electrical signals. The zoom lens has a plurality of lens groups including at least first, second and third lens groups arranged in order from the object side. That is, the first lens group has a positive refractive power which is firmly secured when the magnification is changed. The second lens group has a negative refractive power which is shifted to the image side when the magnification is changed from the wide angle end to the telescopic end. The third lens group has a positive refractive power which is firmly secured when the magnification is changed. The first lens group is configured by arranging, in order from the object side, a single lens having a negative refractive power, a prism having a reflection surface to create a 90° bend in a light path, and at least one single lens having a positive refractive power. The prism has a positive refractive power, and the image side surface thereof has a convex surface directed to the image side.

Thus, the image-capture device of the present invention can be configured at a wide view angle sufficient for the shooting view angle at wide angle end, and at high magnification in order to obtain high quality images over the entire zoom range. The device may further have a super thin configuration.

Figure 15:
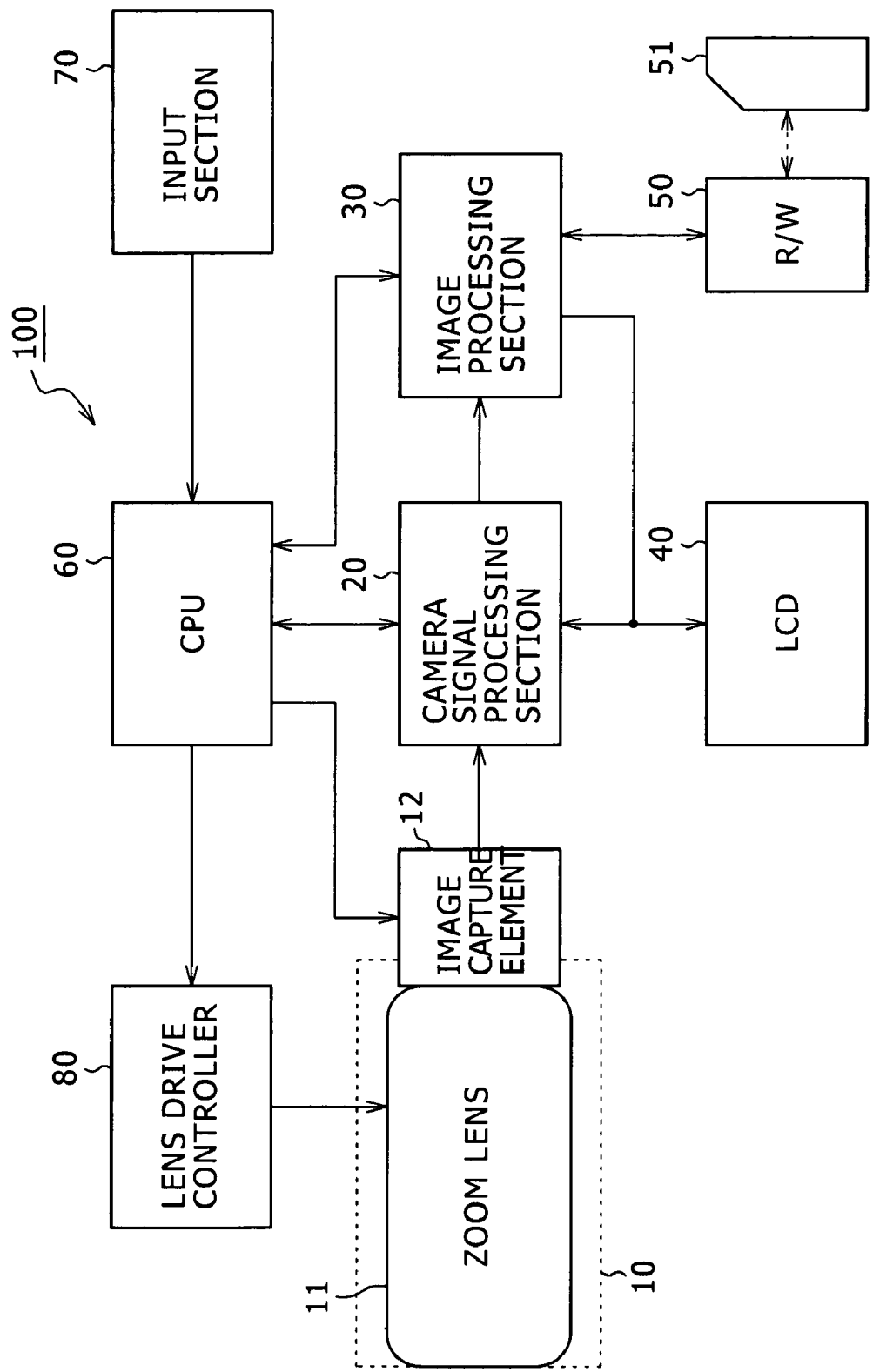
FIG. 15 is a block diagram showing one embodiment in which the image-capture device of the present invention is applied to a digital still camera.

FIG. 15 is a block diagram showing a specific example in which the image-capture device of the present invention is applied to a digital still camera.

A digital still camera 100 includes a camera block 10 for performing the image capture function, a camera signal processing section 20 for performing signal processing, such as the analog/digital conversion of the captured image signals, an image processing section 30 for performing record and regeneration of the image signals, an LCD (liquid crystal display) 40 to display the captured image or the like, a R/W (reader/writer) 50 for writing/reading to/from a memory card 51, a CPU 60 for controlling the entire apparatus, an input section 70 with which the user perform the input operation, and a lens drive controller 80 to control the lens drive within the camera block 10.

The camera block 10 is configured by the optical system including the zoom lens 11 to which the present invention is applied, an image-capture element 12 such as CCD (charge coupled devices) and a CMOS (complementary metal-oxide semiconductor), and the like. The camera signal processing section 20 performs the signal processings with respect to the output signals from the image-capture element 12, such as the conversion into digital signals, noise elimination, image quality correction, and the conversion into luminance signals and color-difference signals. The image processing section 30 performs, based on a predetermined image data format, the compression encoding and extension decoding processings of the image signals, the conversion processing of data specification, such as resolution, or the like.

The memory card 51 is composed of a removable semiconductor memory. The R/W 50 writes the image data encoded by the image processing section 30 in the memory card 51, and reads the image data recorded in the memory card 51. The CPU 60 is the control processing section to control the individual circuit blocks in the digital still camera, and controls the individual circuit blocks based on the instruction input signal from the input section 70. The input section 70 is configured by a shutter release button to perform the shutter operation, a selection switch to select the operation mode, and the like. In response to the user's operation, the input section 70 outputs an instruction input signal to the CPU 60. The lens drive controller 80 controls a motor (not shown) or the like to control the lenses within the zoom lens 11, based on the control signal from the CPU 60.

The operation of the digital still camera 100 will be briefly described below.

In the wait state for capturing an image, under the control of the CPU 60, the image signals captured by the camera block 10 are outputted through the camera signal processing section 20 to the LCD 40, and displayed as camera through images. When the instruction input signal for zooming is inputted from the input section 70, the CPU 60 outputs a control signal to the lens drive controller 80, and a predetermined lens in the zoom lens 11 is shifted based on the control of the lens drive controller 80. Thereafter, when the shutter (not shown) of the camera block 10 is clicked by the instruction input signal from the input section 70, the captured image signals are outputted from the camera signal processing section 20 to the image processing section 30. These image signals are then subjected to compression encoding and converted into digital data of a predetermined data format. The converted data are outputted to the R/W 50 and written in the memory card 51.

Focusing is carried out as follows. That is, for example, when the shutter release button is half-pressed, or alternatively full-pressed for record purpose, the lens drive controller 80 shifts a predetermined lens in the zoom lens 11 based on the control signal from the CPU 60.

When the image data recorded in the memory card 51 is reproduced, in response to the operation through the input section 70, predetermined image data are read from the memory card 51 by the R/W 50, and subjected to extension decoding at the image processing section 30. Thereafter, the reproduction image signals are outputted to the LCD 40, and whereby the reproduced images are displayed.

Although the foregoing embodiments have described the cases where an image-capture device of the present invention is applied to a digital still camera, but the image-capture device is also applicable to other image-capture devices, such as a video cameras.

It should be understood that the shapes, the structure and the numerical values in the foregoing embodiments are for purposes of illustration of mere embodiments for applying the present invention and technical scope of the present invention should not limited by the embodiments It should be understood by those skilled in the art that various modifications, combinations, sub-combinations and alterations may occur depending on design requirements and other factors insofar as they are within the scope of the appended claims or the equivalents thereof.

The present document contains subject matter related to Japanese Patent Application No. 2007-215988 filed in the Japanese Patent Office on Aug. 22, 2007, the entire content of which being incorporated herein by reference.

What is claimed is:

1. A zoom lens comprising:
a plurality of lens groups having at least first, second, third, fourth, and fifth lens groups arranged in order from an object side, wherein;
the first lens group having a positive refractive power which is firmly secured when the magnification is changed,
the second lens group having a negative refractive power which is shifted to the image side when the magnification is changed from the wide angle end to the telescopic end,
the third lens group having a positive refractive power which is firmly secured when the magnification is changed,
the fourth lens group having a positive refractive power which is shifted to the object side when the magnification is changed from the wide angle end to the telescopic end, and
the fifth lens group having a negative refractive power which is firmly secured when the magnification is changed,
wherein the first lens group is configured by arranging, in order from the object side, a single lens having a negative refractive power, a prism having a reflection surface to create a 90° bend in a light path, and at least one single lens having a positive refractive power, a double convex shape, and a double-aspherical surface,
wherein the prism has a positive refractive power, at least one surface thereof has an aspherical surface, a object side surface thereof has a convex surface directed to the object side, and an image side surface thereof has a convex surface directed to the image side,
wherein the second lens group is configured by arranging in order from the object side, a lens having a negative refractive power, a lens having a negative refractive power, a lens having a positive refractive power, and a lens having a negative refractive power, and
wherein the positive lens, the negative lens and the prism constituting the first lens group satisfy one of the following conditional expressions (1) and (2):

$$v1p - v1n = 33.27 \quad (1), \text{ and}$$

$$v1p - v1n = 36.15 \quad (2),$$

where $v1p$ is the average value of the Abbe number, at the d line, of the prism in the first lens group and the positive lens arranged on the image side of the prism (the wavelength is equal to 587.6 nm); and $v1n$ is the Abbe number at the d line of the negative lens arranged at a position most near to the object side in the first lens group.

2. The zoom lens according to claim 1, wherein;
the third lens group has an aperture, and the position of the aperture is firmly secured during the magnification change.

3. The zoom lens according to claim 1, wherein;
an image is formed on a solid image-capture element.

4. The zoom lens according to claim 1, wherein the positive lens, the negative lens and the prism constituting the first lens group satisfies the following conditional expression (2):

$$v1p - v1n = 36.15.$$

5. An image-capture device comprising a zoom lens and a solid image-capture element converting an optical image formed by the zoom lens into electrical signals, wherein;
the zoom lens includes a plurality of lens groups having at least first, second, third, fourth, and fifth lens groups arranged in order from an object side, wherein;
the first lens group has a positive refractive power which is firmly secured when the magnification is changed,
the second lens group has a negative refractive power which is shifted to the image side when the magnification is changed from the wide angle end to the telescopic end,
the third lens group having a positive refractive power which is firmly secured when the magnification is changed,
the fourth lens group having a positive refractive power which is shifted to the object side when the magnification is changed from the wide angle end to the telescopic end, and the fifth lens group having a negative refractive power which is firmly secured when the magnification is changed, wherein the first lens group is configured by arranging, in order from the object side, a single lens having a negative refractive power, a prism having a reflection surface to create a 90° bend in a light path, and at least one single lens having a positive refractive power, a double convex shape, and a double-aspherical surface, wherein the prism has a positive refractive power, at least one surface thereof has an aspherical surface, a object side surface thereof has a convex surface directed to the object side, and an image side surface thereof has a convex surface directed to the image side, wherein the second lens group is configured by arranging, in order from the object side, a lens having a negative refractive power, a lens having a negative refractive power, a lens having a positive refractive power, and a lens having a negative refractive power, and wherein the positive lens, the negative lens and the prism constituting the first lens group satisfy one of the following conditional expressions (1) and (2):

$$\nu 1p - \nu 1n = 33.27 \quad (1), \text{ and}$$

$$\nu 1p - \nu 1n = 36.15 \quad (2),$$

where ν1p is the average value of the Abbe number, at the d line, of the prism in the first lens group and the positive lens arranged on the image side of the prism (the wavelength is equal to 587.6 nm); and ν1n is the Abbe number at the d line of the negative lens arranged at a position most near to the object side in the first lens group.

6. The image-capture device according to claim 5, wherein the third lens group has an aperture, and the position of the aperture is firmly secured during the magnification change.

7. The image-capture device according to claim 5, wherein an image is formed on a solid image-capture element.

8. A zoom lens comprising:
a plurality of lens groups having at least first, second, third, fourth, and fifth lens groups arranged in order from an object side, wherein;
the first lens group having a positive refractive power which is firmly secured when the magnification is changed;
the second lens group having a negative refractive power which is shifted to the image side when the magnification is changed from the wide angle end to the telescopic end;
the third lens group having a positive refractive power which is firmly secured when the magnification is changed;
the fourth lens group having a positive refractive power which is shifted to the object side when the magnification is changed from the wide angle end to the telescopic end; and
the fifth lens group having a negative refractive power which is firmly secured when the magnification is changed, wherein the first lens group is configured by arranging, in order from the object side, a single lens having a negative refractive power, a prism having a reflection surface to create a 90° bend in a light path, and at least one single lens having a positive refractive power, a double convex shape, and a double-aspherical surface, wherein the prism has a positive refractive power, at least one surface thereof has an aspherical surface, a object side surface thereof has a convex surface directed to the object side, and an image side surface thereof has a convex surface directed to the image side, wherein the second lens group is configured by arranging in order from the object side, a lens having a negative refractive power, a lens having a negative refractive power, a lens having a positive refractive power, and a lens having a negative refractive power, and wherein the positive lens, the negative lens and the prism constituting the first lens group satisfy the following conditional expression (1):

$$\nu 1p - \nu 1n = 33.27 \quad (1)$$

where ν1p is the average value of the Abbe number, at the d line, of the prism in the first lens group and the positive lens arranged on the image side of the prism (the wavelength is equal to 587.6 nm); and ν1n is the Abbe number at the d line of the negative lens arranged at a position most near to the object side in the first lens group.

* * * * *